P. La TOURRETTE.
Churn.
No. 161,525. Patented March 30, 1875.
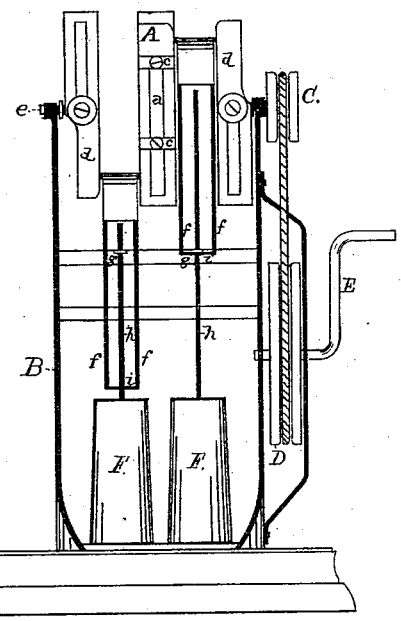
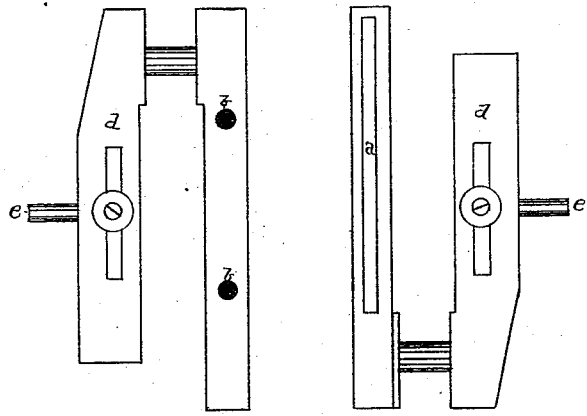
Witnesses
H. C. Memick
T. J. Lacey
Inventor
Peter La Tourette,
By J. C. Robie his Attorney.

UNITED STATES PATENT OFFICE.

PETER LA TOURRETTE, OF VESTAL, NEW YORK.

IMPROVEMENT IN CHURNS.

Specification forming part of Letters Patent No. 161,525, dated March 30, 1875; application filed December 21, 1874.

*To all whom it may concern:*

Be it known that I, PETER LA TOURRETTE, of Vestal, Broome county, New York, have invented a Churning-Machine, of which the following is a specification:

This invention relates to that class of churns operated by a hand-crank or pulley. The nature of the invention consists in the application of cranks having adjustable throws, in combination with the frame and gear work of the machine, which will hereafter be fully explained, the object of the invention being to adjust the throw of the cranks, and thereby increase or diminish the stroke of the dash for churns partially filled, or for churns of different sizes; also to facilitate the operation of churning.

Figure 1 in the accompanying drawings represents a machine embodying my invention. Figs. 2 and 3 are the two parts of the cranks detached.

The crank A is made in two sections, one of which has a slot, $a$, made lengthwise of the center connection, of sufficient length to allow of the required alteration of the throw. The other has two projecting bolts, $b\ b$, set on a line in the outer connection. These bolts fit the slot $a$, and guide the adjustment of the two cranks, which, when in position, form a double crank with opposite throws. They are secured together by screw-nuts $c\ c$ on the ends of the bolts $b\ b$. The side pieces $d\ d$ of the cranks have a slot running parallel with the slot $a$ in the center, for the connection and adjustment of the sectional crank-shaft $e$, which is secured in position by a bolt and nut. The shaft $e$ has its bearing on the top of the frame B, and has a pulley, C, on the end driven by a belt from the driving-pulley D, which is hung on the side of the machine. This pulley is actuated by a hand-crank, E. The connecting-rods $ff$ have two prongs, and work astride projecting guides $g\ g$, attached to a cross-piece in the frame B. The ends of these guides are perforated for the dash-rods $h\ h$ to work in. These dash-rods are connected with the connecting-rods $ff$ by pins $i\ i$, which pass through the dash-rods $h\ h$. F F are the churns of the ordinary construction.

When the churning is light, and there is not cream enough to fill the churns to their usual capacity, the throw of the crank A is shortened, so as to elevate the dash only to the surface of the cream. By loosening up the nuts $c\ c$ and sliding up the slotted center connection $a$ to the required point and securing it, the shaft $e$ is then adjusted on a line and secured, when the machine is ready for operation.

By this invention the dash may be adjusted to a small quantity of cream, or any sized churn may be used.

I claim as my invention—

1. The combination of the double adjustable crank-plate A' and plates $d\ d$ with the shafts $e\ e$, substantially as set forth.

2. The combination of the adjustable crank A, of the frame B, pulley C on the end of shaft $e$, driving-pulley D, hung on the side of frame B, hand-crank E, projecting guides $g\ g$, and connecting-rods $f\ f$, all constructed substantially as herein described, for the purpose set forth.

PETER LA TOURRETTE.

Witnesses:
P. P. ROGERS,
E. W. BRIGHAM.